US008062789B2

(12) United States Patent
Kim et al.

(10) Patent No.: US 8,062,789 B2
(45) Date of Patent: Nov. 22, 2011

(54) LITHIUM SECONDARY BATTERY

(75) Inventors: Jinhee Kim, Yongin-si (KR); Wonchull Han, Yongin-si (KR); Jaeyun Min, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1059 days.

(21) Appl. No.: 11/412,061

(22) Filed: Apr. 25, 2006

(65) Prior Publication Data

US 2006/0263693 A1     Nov. 23, 2006

(30) Foreign Application Priority Data

Apr. 28, 2005   (KR) .................. 10-2005-0035471

(51) Int. Cl.
*H01M 4/13*     (2010.01)
*C08G 63/48*    (2006.01)

(52) U.S. Cl. ......................................... 429/217; 525/7.4
(58) Field of Classification Search ................... 429/251
See application file for complete search history.

(56) References Cited

U.S. PATENT DOCUMENTS

| 4,598,029 A | 7/1986 | Doddapaneni et al. |
| 4,981,944 A * | 1/1991 | Bartels et al. ................ 528/220 |
| 5,256,503 A * | 10/1993 | Cook et al. .................... 429/249 |
| 5,571,634 A * | 11/1996 | Gozdz et al. ................... 429/309 |
| 5,882,721 A * | 3/1999 | Delnick ........................ 427/77 |
| 6,511,775 B2 * | 1/2003 | Clough ......................... 429/248 |
| 6,537,702 B2 * | 3/2003 | Nakura ..................... 429/231.95 |
| 2001/0000485 A1 | 4/2001 | Ying et al. |
| 2005/0221172 A1 | 10/2005 | Kato et al. |

FOREIGN PATENT DOCUMENTS

| JP | 11-80395 | 3/1999 |
| JP | 3-060632 | 4/2000 |
| JP | 2005-285605 | 10/2005 |

OTHER PUBLICATIONS

H.J. Walls, et. al., Fumed silica-based composite polymer electrolytes: synthesis, rheology, and electrochemistry, Journal of Power Sources, 2006, 156-162.*
European Search Report dated Aug. 9, 2006, for EP 06113008.4, in the name of Samsung SDI Co., Ltd.
Kim, H., et al., *electrochemical and physical properties of composite polymer electrolyte of poly (methyl methacrylate) and poly (ethylene glycol diactylate)*, Journal of Power Sources, vol. 124, No. 1, Oct. 1, 2003, pp. 221-224 (English abstract only), XP004454615.
Patent Abstracts of Japan for Publication No. 05-054874, corresponding to Japanese Patent 3-060632 listed above and English machine translation.
English machine translation of Japanese Publication 2005-285605 listed above.
Japanese Office Action dated Dec. 15, 2009 of the corresponding Japanese Patent Application No. 2006-114575, noting listed reference in this IDS.

* cited by examiner

*Primary Examiner* — Cynthia Lee
(74) *Attorney, Agent, or Firm* — Christie, Parker & Hale, LLP

(57) ABSTRACT

A lithium secondary battery including a positive electrode, a negative electrode, a separator for separating the positive and negative electrodes, and a non-aqueous electrolyte. The separator includes a porous film formed of a mixture of a ceramic material and a binder, and the binder is formed of acrylic rubber having a three-dimensional crosslink structure. The separator provides excellent safety characteristics such as resistance to a short circuit and thermal resistance. Also, the separator improves a high-rate discharge characteristics and increases the life span.

29 Claims, 4 Drawing Sheets

LITHIUM SECONDARY BATTERY

BACKGROUND OF THE INVENTION

This application claims priority to and the benefit of Korean Patent Application No. 10-2005-0035471, filed on Apr. 28, 2005, in the Korean Intellectual Property Office, the disclosure of which is incorporated herein in its entirety by reference.

FIELD OF THE INVENTION

The invention relates to a lithium secondary battery, and more particularly, to a lithium secondary battery including a separator having improved safety with respect to characteristics such as heat resistance and resistance to a short circuit.

BACKGROUND

Recently, as light-weight compact portable electronic devices are rapidly and widely developed, need for a high capacity, compact battery used as a power supply for driving them accordingly increase. Particularly, lithium secondary batteries have become rapidly popular in the market because they have an operating voltage of 3.6V or more, which is triple the operating voltage of ordinary batteries used in portable electronic devices, such as nickel-cadmium or nickel-hydrogen batteries. Additionally, the lithium secondary battery's energy density per unit weight is high.

A lithium secondary battery produces electric energy by the oxidation-reduction reaction generated when ion intercalation/de-intercalation occurs in the positive and negative electrodes. In the lithium secondary battery, materials capable of reversely intercalating/de-intercalating lithium ions are used as the positive and negative electrodes, and organic electrolyte or polymer electrolyte is present in the space between the positive and negative electrodes.

The lithium secondary battery includes an electrode assembly formed by winding the positive and negative electrode plates with a separator interposed between them with a certain shape such as that of a jelly roll, a can for storing the electrode assembly and the electrolyte, and a cap assembly assembled to an upper portion of the can. The positive electrode plate of the electrode assembly is electrically connected to the cap assembly through a positive electrode lead, and the negative electrode plate is electrically connected to the can through a negative electrode lead.

A basic function of the separator in a lithium secondary battery is to separate the positive and negative electrodes to prevent a short circuit between them. In addition, it is also important that the separator can draw the electrolyte as required in the battery reaction to retain high ion conductivity. Particularly, the separator of a lithium secondary battery is required to have the additional functions of preventing materials obstructive to the battery reaction from drifting in, or being capable of guaranteeing safety when an abnormal condition occurs. Typically, a micro-porous polymer film formed of polyolefin based materials such as polypropylene and polyethylene, or a multi-layered film having the same composition is used to form the separator. Since conventional separators of lithium secondary batteries are in the shape of sheets or films, the heat caused by an internal short circuit or an overcharge may generate blockage of the pours in a porous film, and accordingly make the sheet-shaped separator shrink. If the sheet shaped separator is shrunk by the internal heat, the positive and negative electrodes may make direct contact with each other in the shrunken part of the separator. This may cause an explosion, bursting, or blasting of the battery.

When heat is generated in conventional film-shaped separators, safety can be guaranteed by the so called shutdown function, in which the polypropylene or polyethylene resin is softened, and the pores of the film are blocked so that the current flows can be shut down. However, conventional separators are vulnerable to an internal short circuit. For example, in a nail test (perforation), i.e., a substitute test for simulating an internal short circuit, since the temperature when an internal short circuit occurs exceeds several hundred degrees centigrade in some local parts depending on test conditions, and the nail passes through the positive and negative electrodes, abnormal heating can be generated together with deformation of the porous film by a softened or shrunken resin. Therefore, safety for an internal short circuit cannot be absolutely guaranteed by only the aforementioned means using the shutdown effect of the resin.

In addition, when an overcharge occurs, lithium dendrites are formed on the entire surface of the film-shaped separator. This is because the separator has a film like shape, and thus a gap may exist between the negative electrode and the film. Accordingly, the lithium ions that cannot penetrate into the inner side of the negative electrode are accumulated on the surface of the negative electrode, i.e., in the gap between the negative electrode and the film, so that they are extracted as a metal phase of lithium. If the lithium is extracted on the entire surface, the extracted lithium dendrites punch through the film-shaped separator, and the positive and negative electrodes can make contact with each other, or a side reaction can be generated between the lithium metal and the electrolyte. Such unexpected reactions may generate heat or gases in the battery assembly, causing the battery to explode or detonate.

SUMMARY OF THE INVENTION

Accordingly, the invention solves the aforementioned problems, and provides a lithium secondary battery including a safer separator having high resistance to short circuits and high thermal resistance.

In addition, the invention provides a lithium secondary battery possessing excellent high-rate charge/discharge characteristics and a long life span.

According to one embodiment of the invention, a lithium secondary battery is provided that includes a positive electrode, a negative electrode, a separator for separating the positive and negative electrodes, and non-aqueous electrolyte, wherein the separator includes a porous film formed of a mixture of a ceramic material and a binder, and the binder is formed of acrylic rubber with a three-dimensional cross-linked structure.

In an embodiment, the acrylic rubber with a cross-linked structure may have from 2 to 10, preferably 4 to 5, crosslink points per molecular weight unit of 10,000 in a main chain molecule.

In one embodiment, the acrylic rubber having a cross-linked structure may be formed by a crosslink reaction between a polymer or copolymer of an acrylic main monomer and a cross-linkable co-monomer.

In an embodiment, The secondary particles formed by partially sintering or re-crystallizing primary particles of the ceramic material may be combined with the binder.

In another embodiment, the separator may further include a separate polyolefin-based resin film in addition to the porous film, or may be composed of only the porous film. The porous film may be utilized on at least one of the positive and negative electrodes.

BRIEF DESCRIPTION OF THE DRAWINGS

The above and other features and advantages of the invention will become more apparent from detailed description of exemplary embodiments thereof with reference to the accompanying drawings in which.

DETAILED DESCRIPTION

Figure 1:
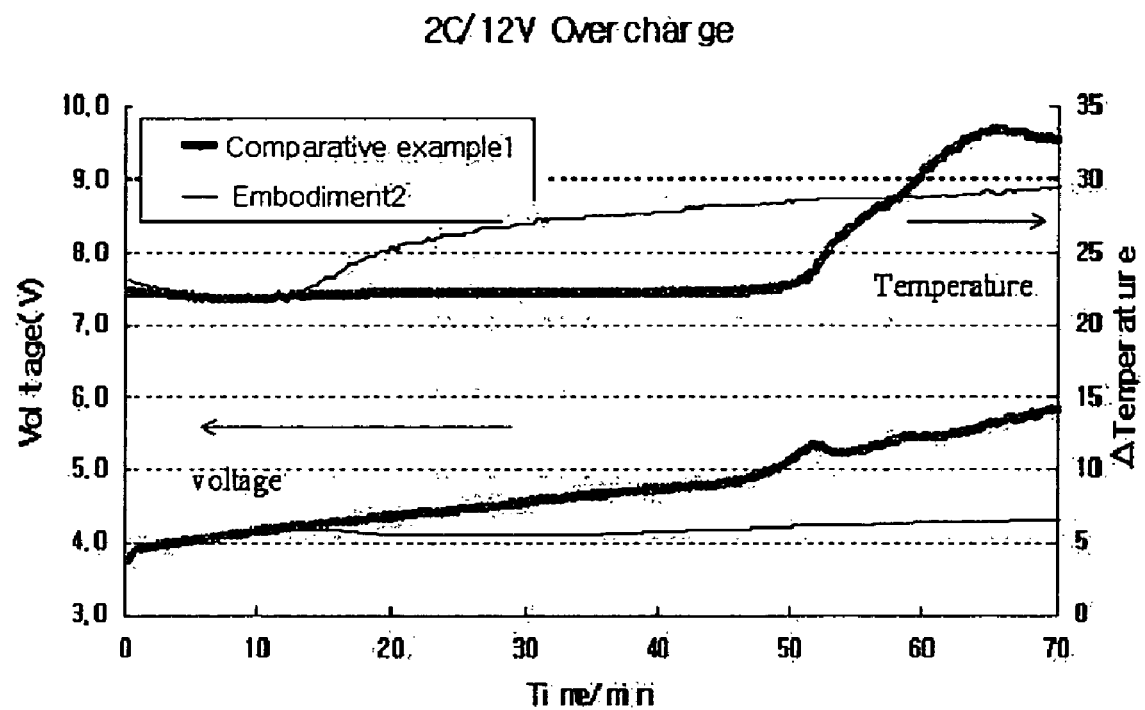
FIG. 1 is a graph showing an over-discharge profile of a battery according to an embodiment of the invention and a comparative example.

Hereinafter, exemplary embodiments of the invention will now be described in detail with reference to the accompanying drawing.

A separator according to an embodiment of the invention includes a porous film formed by combining a ceramic material with a binder, and the binder is formed of acrylic rubber having a three-dimensional cross-linked structure. In order to provide the porous film, the ceramic material and the binder including the cross-linked acrylic rubber are mixed in a solvent to form a paste. Then, the paste is applied to the positive or negative electrode, or both of them. This type of porous film has a function similar to a conventional film shaped separator formed with polyethylene or polypropylene. According to natural characteristics of ceramic materials, its decomposition temperature may reach 1000° C. or more. In addition, the binder formed of the cross-linked acrylic rubber has a decomposition temperature of 250° C. or more. Therefore, a battery having high thermal resistance can be obtained, and the safety with respect to an internal short circuit can be improved.

According to one embodiment of the invention, the cross-linked structure of the acrylic rubber binder has from 2 to 10, preferably from 4 to 5, cross-linked points per molecular weight unit of 10,000 in a main chain molecule. The acrylic rubber having a cross-linked structure may be formed by a cross-linking reaction of polymers or copolymers of acrylic main monomers and cross-linkable co-monomers. If only one kind of polymer or copolymer of the acrylic main monomers is used, the linking structure is susceptible to being cut off because it is weak. However, if a cross-linkable monomer is added to a polymer or copolymer of an acrylic main monomer, the cross-linkable monomer is combined with the polymer or copolymer of the acrylic main monomers to provide a robust mesh structure. This type of highly polymerized compound having a mesh structure seldom swells in a solvent as the cross-linking degree increases. Therefore, the acrylic rubber with a three-dimensional cross-linked structure according to the invention can have resistance to swelling when it is wetted in the electrolyte.

In an embodiment, the acrylic main monomer may include at least one selected from a group consisting of: alkoxyalkyl acrylate selected from a group consisting of methoxymethyl acrylate, methoxyethyl acrylate, ethoxyethyl acrylate, butoxyethyl acrylate, methoxyethoxyethyl acrylate, and dicyclopentenyloxyethyl acrylate; alkenyl acrylate or methacrylate selected from a group consisting of vinyl methacrylate, vinyl acrylate, allyl methacrylate, 1,1-dimethylpropenyl methacrylate, 1,1-dimethylpropenyl acrylate, 3,3-dimethylbutenyl methacrylate, 3,3-dimethylbutenyl acrylate; unsaturated dicarboxylic acid ester selected from a group consisting of divinyl itaconate and divinyl maleate; vinyl containing ether selected from a group consisting of vinyl 1,1-dimethylpropenyl ether and vinyl 3,3-dimethylbutenyl ether; 1-acryloyloxy-1-phenylethene; methyl methacrylate, and combinations thereof.

In one embodiment, the cross-linkable co-monomer may include at least one selected from a group consisting of: alkyl acrylate selected from a group consisting of 2-ethylhexyl acrylate, methyl acrylate, ethyl acrylate, propyl acrylate, butyl acrylate, octyl acrylate, and iso-octyl acrylate; alkenyl chloroacetate selected from a group consisting of vinyl chloroacetate and acryl chloroacetate; ether or ester containing a glycidyl group selected from a group consisting of glycidyl acrylate, vinyl glycidyl ether, and acryl glycidyl ether; unsaturated carboxylic acid selected from a group consisting of acrylic acid, methacrylic acid, and maleic acid; 2-chloroethyl vinyl ether; chloromethyl styrene; and acrylonitrile.

In an embodiment, the polymer or copolymer of the acrylic main monomers and the cross-linkable co-monomer may have a weight ratio of from 90:10 to 60:40, preferably 70:30. As the content of the polymer or copolymer of the acrylic main monomers increases, the binder is likely to be softened and have elasticity or ductility close to that of rubber when the porous film according to the invention is formed on the positive or negative electrode. As a result, the separator may be robustly and safely wound, but the electrolyte may still swell, and thus, the battery characteristics may be degraded if the content of the polymer or copolymer of the acrylic main monomers exceeds a predetermined limitation. As the content of the cross-linkable co-monomer increases, the cross-linked properties are improved, but the binder becomes harder. As a result, the separator may have less ductility, and it may not be appropriately wound.

In an embodiment, the polymer or copolymer of the acrylic main monomers may have a weight-average molecular weight of 10,000 to 5,000,000.

In one embodiment, a portion of side-chain groups of the polymer or co-polymer of the acrylic main monomers may be capped with alkali metals such as Na or K, and then blended with the cross-linkable co-monomer. As a result, they may be cross-linked after the alkali metals are separated at a high temperature, thereby obtaining a cross-linked, acrylic rubber binder.

In one embodiment, polymethyl methacrylate (PMMA) is used as the polymer or co-polymer of the acrylic main monomers, and then it is capped with an alkali metal, a portion of the side-chain groups of the ester would exist as a carboxylate side-chain group.

In an embodiment, the binder may have a cross-linked structure formed by using 2-ethylhexyl acrylate having a weight percentage of 10%, and PMMA having a weight percentage of 90% and a molecular weight of 1,000,000. In this case, the PMMA may have 4 to 5 crosslink points per molecular weight unit of 10,000. As a basis for generating a cross-linking reaction, a portion of PMMA is capped with an alkali metal, and then blended. After the alkali metal is separated at a temperature of 160° C. the binder having a cross-linked structure can be used. In an embodiment, the polymerization of the acrylic rubber may be implemented by suspension polymerization, emulsion polymerization, bulk polymerization, solvent polymerization, etc. In an additional embodiment, the polymerization may be implemented in a continuous system or a batch system.

Figure 3:
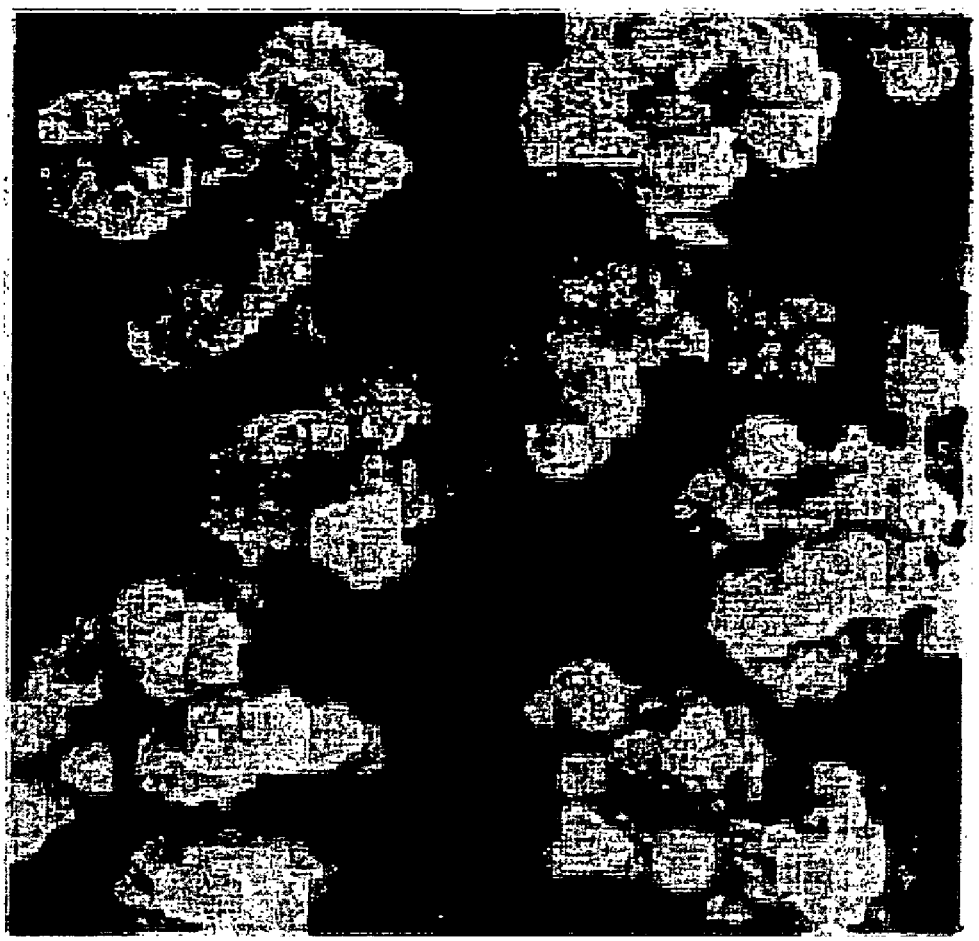
FIG. 3 is a photograph showing primary or secondary ceramic particles with cluster shapes according to an embodiment of the invention.
Figure 4:
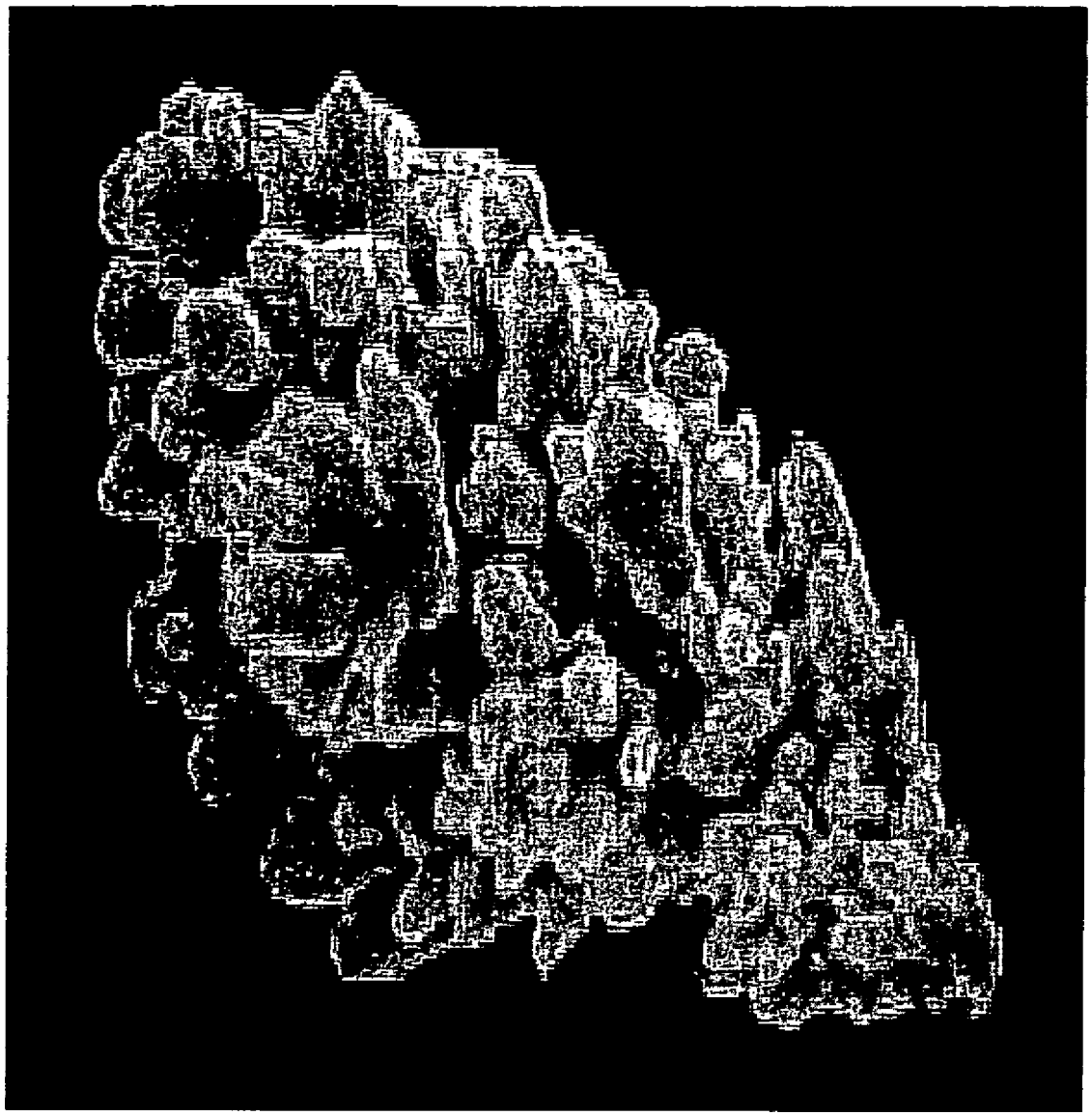
FIG. 4 is a photograph showing primary or secondary ceramic particles with layered shapes according to an embodiment of the invention.

In one embodiment, the porous film may be formed by combining secondary particles with the binder. The secondary particles may be formed by partially sintering or re-crystallizing primary particles of the ceramic material composing the separator. In an embodiment, the secondary particles of the porous film are in the shape of clustered groups, like bunches of grapes (FIG. 3), or layered particle groups (FIG. 4). In addition, according to one embodiment, the primary particles themselves may be clustered particle groups or layered particle groups in which the particles, in the shape of scales, are combined together in a stack of layers (FIG. 4). In an embodiment, the clustered particle group or an individual particle composing the secondary particle may have a width in the range of from 0.01 to 0.3 μm, and an individual flake, composing the layered particle group in the shape of scales, has a width of 100 nm to 1 μm. The size of the particle may be confirmed by viewing an SEM photograph after a material having satisfactory characteristics is formed.

In an embodiment, the ceramic material may be selected from a group consisting of silica ($SiO_2$), alumina ($Al_2O_3$), zirconium oxide ($ZrO_2$), titanium oxide ($TiO_2$), ion-conductive glass, and mixtures thereof. In another embodiment, zirconium oxide is preferably used.

In one embodiment, other ceramic material may include insulative nitrides, hydroxides, and ketones of zirconium, aluminum, silicon, titanium, and mixtures and compounds thereof. In an embodiment, the insulative nitride is used because some nitrides such as a titanium nitride (TiN) have conductivity, so that they are not proper for the ceramic material of the invention.

In an embodiment, the zirconium oxide is used because when a slurry used to form a separator is made, the zirconium oxide particles are easily dispersed in the slurry. The mixture of zirconium oxide particles, solvent and the cross-linked acrylic rubber binder are characterized by a considerable zeta potential, it is advantageous in view of productivity and cost, and chemically safe. Furthermore, the zirconium oxide has superior heat sink properties, and makes a good P/N junction with a lithium compound at high temperature, providing a diode like property. In addition, it is possible to effectively prevent an excessive amount of lithium ions from being inserted into the negative electrode.

In an embodiment, a cohered secondary particle can be obtained by using various methods such as chemical methods, in which all the corresponding materials or a portion of the surface of the primary particles are melted and re-crystallized using chemical materials, or a physical method, in which an external pressure is applied and the like. In one embodiment, necking can be used, i.e., the materials may be heated to a temperature close to the melting point of the particle materials, and the particles are partially melted at the surface and aggregate with each other.

In one embodiment, the amount of ceramic materials that are melted when the particles are partially melted or sintered and then cohered is determined such that the particle shape, which is characteristic in the invention, can be appropriately maintained in the agitation process for mixing the binder and the solvent with the ceramic material to form a porous film solvent having a consistency like a paste or a dispersed phase, and that the density of the resulting porous film decreases.

In one embodiment, a partially sintered particle structure can be obtained by heating a ceramic material such as a zirconium oxide for about ten minutes at a temperature of 900° C. In an embodiment, the ceramic material may be totally dissolved by using a solvent having a high solubility for the ceramic material, or a solvent may be partially mixed with the primary particle powder and dissolved, and then, the solvent may be removed to re-extract the ceramic material.

In an embodiment, the ceramic material has a thermal expansion of from 0.2% or less in a temperature of 200° C., or a thermal expansion of from 0.1 to 0.4% at a temperature of 400° C. If the ceramic material has a thermal expansion higher than the aforementioned range, it may cause deformation of the battery shape due to increased inner pressure in the battery.

In an embodiment, the porous film is composed of an acrylic rubber having a cross-linked structure with a ceramic material that has a cross-sectional porosity of 50% or more. The cross-sectional porosity refers to a proportion of areas occupied by cavities on the entire cross-sectional cutaway surface of the object, and shows how much of the object is porous, while a typical porosity refers to a degree of porosity in a volume. The cross-sectional porosity can be determined by viewing an SEM photograph for the cross-section of a material.

If particles are partially sintered, they are not regularly spaced like a crystal structure because lumped particles are irregularly arranged with one another. In other words, it is difficult to fill the fillers composed of the ceramic material with a high density into the vacant space of the separator. Furthermore, it is possible to prevent a resin from being added into the space between the particles by reducing the proportion of the resin. These methods will be helpful for increasing the cross-sectional porosity of the separator.

In an embodiment, the thermal conductivity of the ceramic material according to the is 10 W/(m×K) within a relatively wide temperature range of 500 to 1000° C.

In an additional embodiment, the relative dielectric constant of the ceramic material according to the invention is within a range of 1 to 20. If the relative dielectric constant is higher than 20, capacity may be short. On the contrary, if the relative dielectric constant is lower than 1, it is difficult to form a material having a band gap.

In one embodiment, dielectric loss is within a range of $10^{-5}$ to $10^{-2}$ at a frequency of 1 MHz. If the electrostatic loss is lower than $10^{-5}$, reproducibility for having a desired band gap is reduced, and safe production may be difficult. On the contrary, it is higher than $10^{-2}$, sufficient capacity cannot be obtained.

According to an embodiment of the invention, the porous film may be attached to at least one surface of at least one of the positive and negative electrodes of the secondary battery. The positive and negative electrodes are manufactured by coating an electrode slurry composite, formed by dispersing activation material binders and conductors into a solvent, on the electrode charge collector. As described above, the porous film can be formed by coating the porous film solvent on the electrodes having an activation material on their surface, and baking it to remove the solvent from the coated, porous film solvent.

In an embodiment, the porous film may surround the entire surface of the electrode plate such that the porous film solvent is made by regularly dispersing the ceramic particles into a mixture of the acrylic rubber binder and the solvent, and the electrode plate that is formed by coating the activation material on the electrode charge collector is dipped into the porous film solvent. In an additional embodiment, the porous film can be made by spraying the porous film solvent onto the electrode plate.

In an embodiment, in order to provide the porous film in at least one of the facing electrode surfaces of the positive and negative electrodes as in, for example, a jelly roll type electrode assembly formed by stacking and winding both the electrodes, the porous film may be formed on each outer surface of both of the electrodes. In another embodiment, the porous film may be formed on each inner surface of the electrodes, or formed on an inner surface of one of the electrodes and each outer surface of both of the electrodes.

In an embodiment, a porous film solvent has been made by dispersing the secondary particles of the ceramic material into the liquid material composed of binders and a solvent. When the method of dipping the electrodes into the porous film solvent is used, the upper and lower narrow surfaces as well as the inner and outer surfaces are covered with the porous film. Therefore, a short circuit between the electrode covered with the porous film and other electrodes can be effectively prevented.

In an embodiment, the thickness of the porous film can be adjusted depending on ion conductivity and energy density, and may be within a range of 1 to 40 μm, preferably 5 to 20 μm. If the thickness of the porous film is smaller than 1 μm, the mechanical strength may be insufficient. If the thickness of the porous film is larger than 40 μm, it is not preferable in view of the energy density.

In an embodiment, a small amount of the acrylic rubber binder having a cross-linked structure according to the invention is applied into the slurry for forming the porous film. In a porous film according to the invention, the weight ratio of the ceramic material and the binder may be within a range of 95:5 to 80:20. If the weight ratio is within this range, it is possible to prevent the ceramic material from being totally covered with the binder. In other words, it is possible to avoid the problem that the binder covers the ceramic material, and thus, ions are not conducted into the ceramic material.

Figure 2:
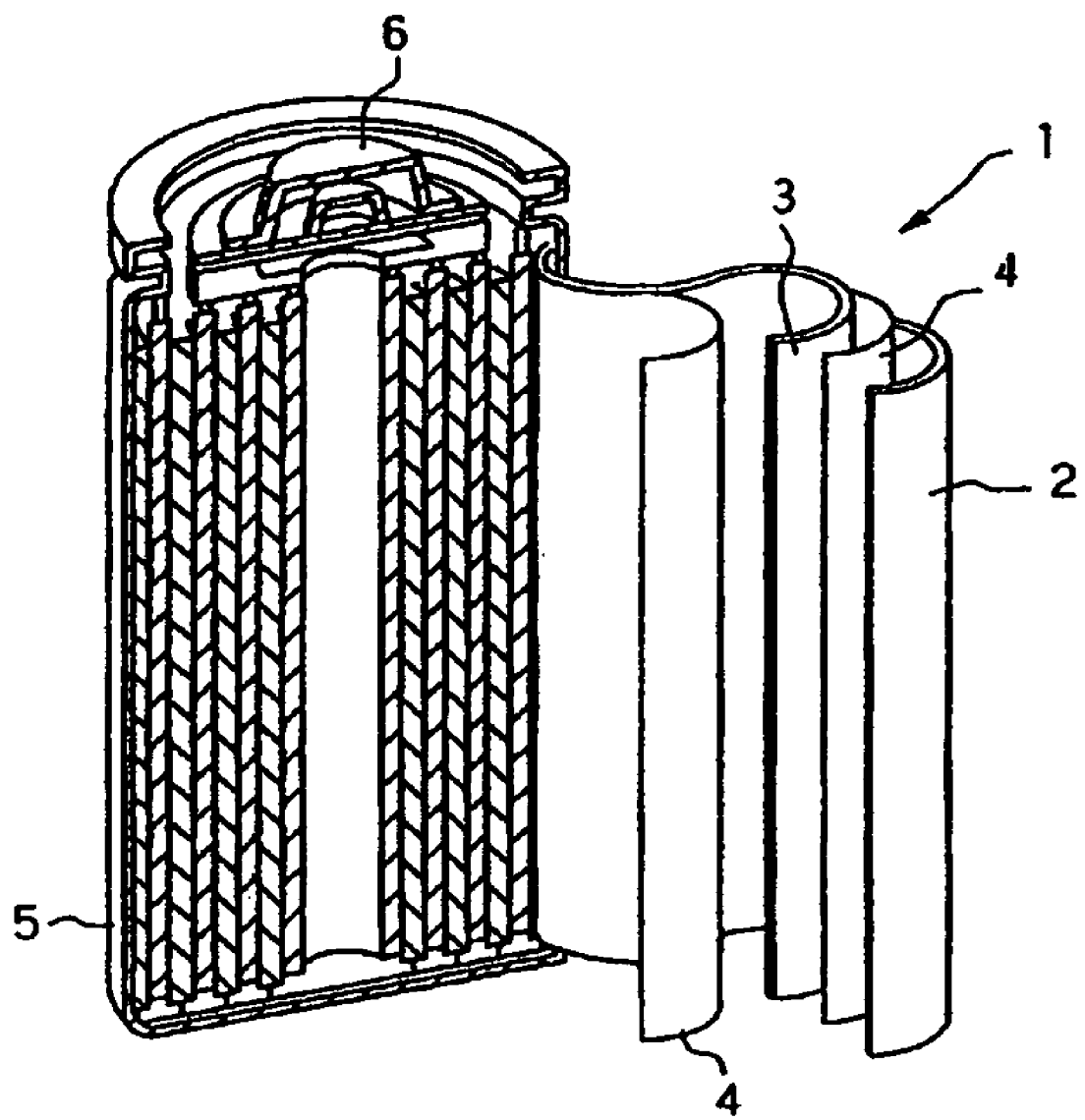
FIG. 2 is a cross-sectional view of a lithium battery according to one embodiment of the invention.

According to an embodiment of the invention, as illustrated in FIG. 2, the secondary lithium battery 1 includes an electrode assembly comprising the porous film formed on at least one of the positive electrode 3, the negative electrode 2, or on both of them. Optional separators 4 may be included between the electrodes 2, 3. The electrodes 2, 3 and optional separators 4 are stacked and wound to form the electrode assembly. The electrode assembly is placed within a cylindrical battery case 5 with an electrolyte and sealed with a sealing portion 6. The configuration of the secondary lithium battery is not limited to the structure shown in FIG. 2, as it can be readily modified into other types of batteries including prismatic batteries, pouch type batteries and other types of batteries that are well understood in the related art. Since the porous film itself functions as a separator, it is possible to omit installation of a separator. While the conventional film type separator may shrink at a high temperature, the porous film according to the invention is not shrunken or melted. In a conventional polyolefin-based film separator, portions of the film adjacent to the damaged area are continuously shrunken or melted in addition to the damage caused by the initial explosion during an internal short circuit, so that a larger area of the film is burned out, and the short circuit becomes a harder short circuit. However, in the electrode having the porous film according to the invention, only the portions of the film that have experienced the short circuit are damaged, and the damage is not propagated to other areas. Furthermore, the electrode having the porous film according to the invention does not experience a hard short, but a minute, soft short, even when an overcharge occurs, so that the overcharged current is continuously consumed. Therefore, a predetermined voltage level of 5 to 6V and a battery temperature below 100° C. can be maintained. As a result, it is possible to improve overcharge safety.

In an embodiment, similar to a conventional lithium secondary battery, a separate polyolefin resin insulation film may be arranged between the two electrodes that have been wound. In this case, both the porous film and the polyolefin resin insulation film function as a separator. In one embodiment, the polyolefin resin film may be a polyethylene single-layered film, a polypropylene single-layered film, a polypropylene-polyethylene-polypropylene multi-layered film, and the like.

The positive electrode of the lithium secondary battery includes positive electrode activation materials into/from which lithium ions can be inserted or separated. In one embodiment, the positive electrode activation material may include at least one selected from a group consisting of cobalt (Co), manganese (Mn), nickel (Ni) and at least one of composite oxides of lithium, and combinations thereof. In another embodiment, the following lithium compounds may be used:

  (1)

  (2)

  (3)

  (4)

  (5)

  (6)

  (7)

  (8)

  (9)

  (10)

  (11)

  (12)

  (13)

where $0.9 \leq x \leq 1.1$, $0 \leq y \leq 0.5$, $0 \leq z \leq 0.5$, and $0 \leq \alpha \leq 2$, the materials M and M' are the same or different from each other, and are selected from the group consisting of Mg, Al, Co, K, Na, Ca, Si, Ti, Sn, V, Ge, Ga, B, As, Zr, Mn, Cr, Fe, Sr, V, and rare-earth elements, the material A is selected from the group consisting of O, F, S, and P, and the material X is selected from the group consisting of F, S, and P.

The negative electrode of a lithium secondary battery includes a negative electrode activation material into/from which lithium ions can be inserted or separated. In an embodiment, the negative electrode activation material includes carbon materials such as crystalline structure carbon, amorphous structure carbon, carbon composites, and carbon fiber, lithium metal, lithium alloy, etc. In one embodiment, the amorphous carbon may include hard carbon, cokes, mesocarbon micro-bead (MCMB) plasticized in a temperature of 1500° C. or less, meso-phase pitch-based carbon fiber (MPCF), etc. In another embodiment, the crystalline structure carbon may include a graphite-based material, such as natural graphite, graphited cokes, graphited MCMB, graphited MPCF, etc. In one embodiment, the negative electrode activation material is formed of crystalline structure carbon. In another embodiment, in the crystalline structure of the graphite, an interval (d002) of a carbon hexagonal plane is within a rage of 3.35 to 3.38 Å, and the length (Lc) of a crystal in the c-axis direction is 20 nm or more. In a further embodiment, the lithium alloy may include an alloy with aluminum (Al), zinc (Zn), bismuth (Bi), cadmium (Cd), antimony (Sb), silicon (Si), lead (Pb), tin, gallium (Ga), or indium (In).

In one embodiment, the positive electrode charge collector may be formed of aluminum or an aluminum alloy, and the negative electrode charge collector may be formed of copper and a copper alloy. In another embodiment, the positive and negative electrode charge collectors may be in the shape of a foil, film, or sheet, or may be punched, porous, or foamed.

The positive and negative electrodes may further include conductive materials for improving electric conductivity. In an embodiment, the conductive material may include at least one selected from a group consisting of a graphite based conductor, a carbon black based conductor, a metal or metal compound based conductor, and combinations thereof. In an embodiment, the graphite based conductor may include artificial graphite, natural graphite, and the like. In another embodiment, the carbon black based conductor may include acetylene black, ketjen black, denka black, thermal black, channel black, and the like. In a further embodiment, the metal or metal compound based conductor may include tin, tin oxide, tin phosphoric acid ($SnPO_4$), titanium oxide, potassium titanic acid, perovskite such as $LaSrCoO_3$, and $LaSrMnO_3$, and the like. However, the invention is not limited to the aforementioned conductors. In one embodiment, the content of the conductor is 0.1 to 10 weight percent with respect to the positive electrode activation material. If the content of the conductor is less than 0.1 weight %, the electrochemical properties may be degraded. If the content of the conductor is larger than 10 weight %, the energy density per unit weight is reduced.

The binder for the activation materials has the functions of softening activation materials such as pastes, consolidating inter-bonding of activation materials and bonding forces with a charge collector, buffering the swelling or shrinking of the activation materials, and the like. In an embodiment, the binder may include polyvinyledene fluoride, copolymer of polyhexafluoropropylene and polyvinyledene fluoride (P(VdF/HFP)), poly(vinylacetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoro ethylene, polyvinyl chloride, polyacrylonitrile, polyvinyl pyridine, styrene-butadiene rubber, acrylonitrile-butadiene rubber, and the like. In another embodiment, the content of the binder may be within a range of 0.1 to 30 weight %, more preferably 1 to 10 weight % of the electrode activation material. If the content of the binder is too small, the binding force between the activation material and the charge collector is not sufficient. If the content of the binder is too large, the binding force is sufficient, but the content of the electrode activation material should be accordingly reduced. This is disadvantageous to increase the battery capacity.

The solvent used to disperse the electrode activation material, the binder, and the conductor may be hydrophilic or non-hydrophilic. In an embodiment, N-methyl-2-pyrolidone (NMP), dimethyl formamide, dimethyl aceteamide, N,N-dimethylamino prophylamin, ethylene oxide, tetrahydropuran, etc., may be used as the non-hydrophilic solvent.

When the porous film according to an embodiment of the invention is formed in the negative electrode, if the binder in the negative electrode activation material is hydrophilic, such as styrene-butadiene rubber, an organic material is used as the binder of the porous film. In another embodiment, if the binder in the negative electrode activation material is organic, such as polyvinylidene fluoride, a hydrophilic material is used as the binder of the porous film. If the same organic or hydrophilic binder is commonly used in the negative electrode activation material and the porous film, a similar organic or hydrophilic solvent should be used in its dispersion solvent. Accordingly, the negative electrode activation layer, that has been already dried, may be re-melted out to the solvent of the porous film solvent when the porous film solvent is coated on the negative electrode activation layer that has already been formed thereon.

In an embodiment, when an organic binder is used as the solvent of the porous film solvent, it may include NMP/cyclohexanone having a volume ratio of 0:100 to 50:50, preferably 30:70, or, isoprophyl alcohol, toluene, xylene, etc., may be substituted for the NMP. In an embodiment, if the binder of the negative electrode activation material is organic, the binder of the porous film solvent may be hydrophilic, and water may be used as a solvent.

In an embodiment, the non-hydrophilic electrolyte of a lithium secondary battery may include an additive for improving charge/discharge characteristics and preventing an overcharge in addition to the lithium salt and the non-hydrophilic organic solvent. The lithium salt functions as a source for supplying lithium ions in a battery so as to enable fundamental operation of a lithium battery, and the non-hydrophilic organic solvent functions as a medium for transferring the ions concerned in the electrochemical reaction in a battery.

In an embodiment, the lithium salt may include at least one selected from a group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where, x and y are natural numbers), LiCl, LiI, and mixtures thereof. In one embodiment, the concentration of the lithium salt may be within a range of 0.6 to 2.0M, preferably 0.7 to 1.6M. If the concentration of the lithium salt is below 0.6M, the conductivity of the electrolyte is reduced, and the performance of the electrolyte is also degraded. If the concentration of the lithium salt is over 2.0M, the viscosity of the electrolyte increases, and mobility of the lithium salt is reduced.

In an embodiment, the non-hydrophilic organic solvent may include at least one selected from a group consisting of carbonates, esters, ethers, ketones, or mixtures thereof. The organic solvent should have a high dielectric constant and a low viscosity in order to increase ion dissociation and facilitate conductivity of the ions. In one embodiment, a mixed solvent composed of two or more solvents, of which one has a high dielectric constant and a high viscosity and the other has a low dielectric constant and a low viscosity, is used as the organic solvent.

In an embodiment, when a carbonate based solvent is used as a non-hydrophilic organic solvent, a mixture of cyclic carbonate and chain carbonate is used. In another embodiment, ethylene carbonate (EC), propylene carbonate (PC), 1,2-butylene carbonate, 2,3-bythylene carbonate, 1,2-pentylene carbonate, 2,3-pentylene carbonate, vinylene carbonate (VC), etc., may be used as the cyclic carbonate. In one embodiment, materials having a high dielectric constant, such as ethylene carbonate and propylene carbonate, are used. In another embodiment, when artificial graphite is used as the negative electrode activation material, ethylene carbonate is used. In a further embodiment, the chain carbonate may include dimethyl carbonate (DMC), diethyl carbonate (DEC), dipropyl carbonate (DPC), methylpropyl carbonate (MPC), ethylmethyl carbonate (EMC), ethylpropyl carbonate (EPC), etc. In yet another embodiment, materials having a low viscosity, such as dimethyl carbonate, ethylmethyl carbonate, and diethyl carbonate are used.

In one embodiment, the esters may include methyl acetate, ethyl acetate, propyl acetate, methyl propionate, ethyl propionate, γ-butyrolactone (GBL), γ-valerolactone, γ-caprolactone, δ-valerolactone, ∈-caprolactone, and the like. In another embodiment, the ethers may include tetrahydropuran, 2-methyltetrahydropuran, dibutylether, and the like. In yet another embodiment, the ketones may include polymethylvinyl ketone, and the like.

Embodiments according to the invention and a comparative example will now be described. However, the following embodiments should be regarded as only examples of the invention, and not a limitation thereof.

Comparative Example 1

$LiCoO_2$ as the positive electrode activation material, polyvinylidene fluoride (PVDF) as the binder, and carbon as the conductor are mixed in a weight ratio of 92:4:4. Then, the mixture is dispersed into N-methyl-2-pyrrolidone to produce the positive electrode slurry. The slurry is coated on an aluminum foil having a thickness of 20 μm, and then dried and rolled to produce a positive electrode. Artificial graphite as the negative electrode, styrene-butadiene rubber as the binder, and carboxymethyl cellulose as the emulsifier are mixed in a weight ratio of 96:2:2, and dispersed into water to produce the negative electrode activation material slurry. Then, the slurry is coated on a copper foil having a thickness of 15 μm, and then dried and rolled to produce a negative electrode.

Between the produced electrodes, a film separator having a thickness of 20 μm, formed of polyethylene(PE), is inserted and then wound and pressed. The resulting assembly is inserted into a cylindrical can. Subsequently, electrolyte is injected into the can. Consequently, a lithium secondary battery is obtained. A mixed solution of 1.3M $LiPF_6$ and ethylene carbonate/ethylmethyl carbonate (at a weight ratio of 3:7) is used as the electrolyte.

Embodiment 1

A secondary particle power of zirconium oxide ($ZrO_2$) (96 weight %) as the ceramic material and acrylic rubber (4 weight %) including polymethyl methacrylate (PMMA) as the binder are mixed. The mixture is diluted with a mixed solvent of N-methyl-2-pyrrolidone/cyclohexanone having a volume ratio of 3:7 so as to have a viscosity of 3000 cps to produce a mixed solution. The negative electrode fabricated according to the Comparative Example 1 is dipped into the mixed solution, and the thickness of the film is controlled by a gravure roller. Then, the negative electrode plate is passed through a drier at a temperature of 120° C. to remove the solvent. Finally, a porous film having a thickness of 10 μm is formed on the negative electrode.

Subsequently, the same processes used in Comparative Example 1 are executed by using a PE film separator having a thickness of 10 mm.

Embodiments 2 to 10

Using the ceramic materials and binders shown in the following Table 1, a porous film having a thickness of 20 μm is formed on the negative electrode through a similar method as disclosed in Embodiment 1 above. Then, the Comparative Example 1 is similarly executed except for the portion involving the film separator.

High Rate Discharge Capacity

For the lithium secondary battery manufactured according to the Embodiment 1 and the Comparative Example 1, a cutoff charge of 20 mAh is executed in an electrostatic current and voltage of 1 C/4.2V. Then, a cutoff discharge of 3 C/3V is executed. Assuming that the discharge capacity of the battery manufactured according to Comparative Example 1 is 100%, a discharge capacity of 3 C is calculated, and the result is shown in the Table 1. The displayed value is an average of the measurement values for 10 batteries.

Cyclic Life Characteristics

For the lithium secondary batteries of the Comparative Example 1 and the Embodiments 1 to 10, a cutoff charge of 20 mAh is executed in an electrostatic current and voltage of 1 C/4.2V. Then, a cutoff discharge of 1 C/3.0V is executed. After the aforementioned charge/discharge operations are performed for 800 cycles, a 300 cycle capacity constancy is calculated assuming that the discharge capacity of 300 cycles of the Comparative Example 1 is 100%. The result is shown in Table 1. Each value is an average of the measurement values for 10 batteries.

Perforation and Overcharge Safety

A nail having a diameter of 5 mm is used to perforate the centers of fully charged lithium secondary batteries manufactured according to the Comparative Example 1 and the Embodiments 1 to 10 along a perpendicular direction to a longitudinal axis with a velocity of 40 mm/sec. The battery condition is noted, and the results are shown in Table 1.

The lithium secondary batteries of the aforementioned Comparative Example 1 and the Embodiments 1 to 10 are overcharged in a fully charged state at an electrostatic current and voltage of 2 C/12V for two hours. The results of measuring the condition of the battery are shown in the following Table 1.

In Table 1, the number precedent of the reference symbol L designates the number of batteries tested. Indices for evaluating safety from overcharge and perforation are as follows:

L0: good, L1: leakage, L2: spark, L3: flame, L4: smoke, L5: fire, and L6: breakdown For example, if the index indicates 20L4, the number of tested batteries is 20, and all of them produced smoke after the safety test.

TABLE 1

| | | Porous film | | 3 C | 300 cycle | | 2 C/12 V |
| | Film Separator | Inorganic Oxide 96 wt % | Binder 4 wt % | discharge capacity (%) | capacity constancy (%) | Perforation (nail) | Over charge |
|---|---|---|---|---|---|---|---|
| Comparative Example 1 | PE 20 μm | — | — | 100 | 100 | 20L4 | 20L4 |
| Embodiment 1 | PE 10 μm | $ZrO_2$ | Copolymer of PMMA and 2-ethylhexylacrylate | 97 | 95 | 20L1 | 20L0 |

TABLE 1-continued

|  | Film Separator | Porous film Inorganic Oxide 96 wt % | Binder 4 wt % | 3 C discharge capacity (%) | 300 cycle capacity constancy (%) | Perforation (nail) | 2 C/12 V Over charge |
|---|---|---|---|---|---|---|---|
| Embodiment 2 | — | ZrO$_2$ | Copolymer of PMMA and 2-ethylhexylacrylate | 110 | 130 | 20L1 | 20L0 |
| Embodiment 3 | — | ZrO$_2$ | Copolymer of PMMA and 2-ethylhexylacrylate | 115 | 125 | 20L1 | 20L0 |
| Embodiment 4 | — | ZrO$_2$ | Copolymer of PMMA and Octylacrylate | 126 | 135 | 20L1 | 20L0 |
| Embodiment 5 | — | Al$_2$O$_3$ | Copolymer of PMMA and 2-ethylhexylacrylate | 120 | 130 | 20L1 | 20L0 |
| Embodiment 6 | — | Al$_2$O$_3$ | Copolymer of PMMA and Acrylonitrile | 121 | 129 | 20L1 | 20L0 |
| Embodiment 7 | — | Al$_2$O$_3$ | Copolymer of PMMA and Octylacrylate | 119 | 118 | 20L1 | 20L0 |
| Embodiment 8 | — | TiO$_2$ | Copolymer of PMMA and 2-ethylhexylacrylate | 127 | 128 | 20L1 | 20L0 |
| Embodiment 9 | — | TiO$_2$ | Copolymer of PMMA and Octylacrylate | 130 | 134 | 20L1 | 20L0 |
| Embodiment 10 | — | TiO$_2$ | Copolymer of PMMA and Octylacrylate | 150 | 140 | 20L1 | 20L0 |

As shown in Table 1, Comparative Example 1 shows the results of measuring the performance of a conventional battery including a PE separator having a thickness of 20 μm. Embodiment 1 shows the results of measuring the performance of a battery including a porous film formed of zirconium oxide and a binder with a thickness of 10 μm in addition to the construction disclosed in Comparative Example 1. The battery according to Embodiment 1 has an additional layer in comparison to that of Comparative Example 1, and thus the resistance is slightly higher. Therefore, its high-rate discharge capacity and life span are accordingly reduced. However, one of skill in the art should recognize that the perforation and overcharge characteristics are significantly improved due to the porous film.

In the batteries according to Embodiments 2 to 10, the PE film separator which has a thickness of 20 μm is removed. A porous film having a similar function is formed on only the negative electrode with a thickness of 20 μm. Embodiments 2 to 10 show the results of measuring the performance of the batteries manufactured by changing the type of cross-linked acrylic rubber binder for each battery, and using zirconium oxide (corresponding to an inorganic oxide filler), alpha alumina, and titanium oxide. Since the resistance of the porous film is significantly less than that of the conventional PE film separator, assuming they have the same thickness, the high-rate discharge capacity and the life span of the batteries according to Embodiments 2 to 10 are improved at about 20 to 40% in comparison to those of Comparative Example 1.

In addition, since the porous film is safer under perforation and overcharge conditions, a battery having a porous film according to Embodiments 1 to 10 has a small amount of leakage and heat when perforated with a nail, while a battery according to Comparative Example 1 produces fires and flames. In the case of the overcharge condition, it was recognized that the conventional battery suffers from the extraction of lithium on the entire surface of the film and the shrinkage and melting of the internal separator due to the heat caused by the overcharge, often causing a fire and explosion. On the contrary, batteries having a porous film according to Embodiments 1 to 10 do not suffer from deformation of the battery's appearance. Thus, safety can be improved over that of the conventional battery.

FIG. 1 is a graph showing an overcharge profile of the batteries according to Embodiment 2 and Comparative Example 1. In FIG. 1, it is shown that the battery having a conventional PE film separator according to Comparative Example 1 has continuously increasing voltage and temperature due to the heat in an overcharge condition. On the contrary, in the battery having a porous film according to Embodiment 2 instead of the conventional PE film separator, the porous film consumes the overcharge current from only a minute short. Thus, a constant level of voltage is maintained after the voltage initially increases. Also, abnormal battery heat is not generated because the overcharge current is continuously consumed during the minute short. It may be recognized that a constant temperature is maintained after the temperature initially increases. The porous film generates a minute short in an initial stage of the overcharge, but consumes the overcharge current. At the same time, lithium dendrite is generated in the portions relatively distant from the electrode plate. Since the porous film functions as a P/N junction semiconductor for the lithium metal accumulated on the negative electrode, the porous film has a positive polarity with respect to the lithium metal. Therefore, the porous film functions as a shield for preventing the lithium positive ions from moving into the negative electrode (also, referred to as an "ion shield").

According to the invention, it is possible to provide a lithium secondary battery including a separator having excellent safety characteristics such as resistance to a short circuit and thermal resistance. The separator according to the invention improves the high-rate discharge characteristics and life characteristics of lithium secondary batteries.

While the invention has been shown and described with reference to exemplary embodiments thereof, it will be understood by those of ordinary skill in the art that various changes in form and details may be made therein without departing from the spirit and scope of the invention as defined by the following claims.

What is claimed is:

1. A lithium secondary battery comprising a positive electrode, a negative electrode, a separator adapted to separate the positive and negative electrodes, and a non-aqueous electrolyte, wherein the separator includes a porous film comprising a mixture of a ceramic material and a binder, and the binder comprises an acrylic rubber having a cross-linked structure, wherein the acrylic rubber structure is formed by a cross-linking reaction between a polymer or copolymer of an acrylic main monomer and a cross-linkable co-monomer, wherein the polymer or copolymer of the acrylic main monomer and the cross-linkable co-monomer are mixed in a weight ratio in the range of 90:10 to 60:40 and the cross-linkable co-monomer is selected from the group consisting of 2-ethylhexyl acrylate, octyl acrylate, acrylonitrile, and combinations thereof.

2. The lithium secondary according to claim 1, wherein the acrylic rubber has 4 to 5 cross-linked points per molecular weight unit of 10,000 in a main chain molecule.

3. The lithium secondary battery according to claim 1, wherein the acrylic main monomer is methyl methacrylate.

4. The lithium secondary battery according to claim 1, wherein the polymer or co-polymer of the acrylic main monomer has a weight-average molecular weight of 10,000 to 5,000,000.

5. The lithium secondary battery according to claim 1, wherein the polymer or copolymer of the acrylic main monomer and the cross-linkable co-monomer are mixed with a weight ratio of 70:30.

6. The lithium secondary battery according to claim 1, wherein a portion of a side-chain of the polymer or copolymer of the acrylic main monomer is capped with an alkali metal.

7. The lithium secondary battery according to claim 6, wherein the alkali metal is Na or K.

8. The lithium secondary battery according to claim 1, wherein the ceramic material comprises a secondary ceramic particle, and wherein the secondary ceramic particle is a sintered or recrystallized primary ceramic particle and is combined with the binder.

9. The lithium secondary battery according to claim 8, wherein the secondary ceramic particle comprises a cluster shape or a layered particle group.

10. The lithium secondary battery according to claim 9, wherein the primary ceramic particle has a cluster shape having a diameter within the range of 0.01 to 0.3 μm.

11. The lithium secondary battery according to claim 9, wherein the primary particle composing a layered particle group is a flake in the shape of scales having a width in the range of 100 nm to 1 μm.

12. The lithium secondary battery according to claim 8, wherein the ceramic material comprises a material selected from a group consisting of alumina ($Al_2O_3$), zirconium oxide ($ZrO_2$), titanium oxide ($TiO_2$), and combinations thereof.

13. The lithium secondary battery according to claim 8, wherein the ceramic material is selected from the group consisting of insulative nitrides, hydroxides, and ketones of zirconium, aluminum, silicon, titanium, and combinations thereof.

14. The lithium secondary battery according to claim 8, wherein the ceramic material has a thermal expansion of 0.2% or less at a temperature of 200° C., or a thermal expansion in the range of 0.1 to 0.4% at a temperature of 400° C.

15. The lithium secondary battery according to claim 8, wherein the thermal conductivity of the ceramic material is within 10% of 10 W/(m×K) in the temperature range of 500 to 1000° C.

16. The lithium secondary battery according to claim 8, wherein dielectric loss of the ceramic material is within the range of $10^{-5}$ to $10^{-2}$ at a frequency of 1 MHz.

17. The lithium secondary battery according to claim 1, wherein the ceramic material and the binder are mixed in a weight ratio in the range of 95:5 to 80:20.

18. The lithium secondary battery according to claim 1, wherein the porous film has a cross-sectional porosity of 50% or more.

19. The lithium secondary battery according to claim 1, wherein the separator further comprises a separate polyolefin-based resin film in addition to the porous film.

20. The lithium secondary battery according to claim 19, wherein the polyolefin-based resin film is selected from the group consisting of polyethylene single-layered film, polypropylene single-layered film, and polypropylene-polyethylene-polypropylene multi-layered film.

21. The lithium secondary battery according to claim 1, wherein the separator is formed of only the porous film.

22. The lithium secondary battery according to claim 1, wherein the porous film is provided on at least one of the positive and negative electrodes.

23. The lithium secondary battery according to claim 22, wherein the porous film is formed through a method selected from the group consisting of dipping the electrodes in a mixed solution formed by dispersing the ceramic material and the binder into a solvent, spraying the mixed solution to the electrode surface, printing the mixed solution on the entire electrode surface, and combinations thereof.

24. The lithium secondary battery according to claim 1, wherein the porous film has a thickness in the range of 1 to 40 μm.

25. The lithium secondary battery according to claim 24, wherein the porous film has a thickness in the range of 5 to 20 μm.

26. The lithium secondary battery according to claim 1, wherein the positive and negative electrodes comprise positive and negative electrode activation materials that can intercalate and de-intercalate lithium ions.

27. The lithium secondary battery according to claim 26, wherein the positive electrode activation material is selected from the group consisting of:

$$Li_xMn_{1-y}M_yA_2 \qquad (1),$$

$$Li_xMn_{1-y}M_yO_{2-z}X_z \qquad (2),$$

$$Li_xMn_2O_{4-z}X_z \qquad (3),$$

$$Li_xMn_{2-y}M_yM'_zA_4 \qquad (4),$$

$$Li_xCo_{1-y}M_yA_2 \qquad (5),$$

$$Li_xCo_{1-y}M_yO_{2-z}X_z \qquad (6),$$

$$Li_xNi_{1-y}M_yA_2 \qquad (7),$$

$$Li_xNi_{1-y}M_yO_{2-z}X_z \qquad (8),$$

$$Li_xNi_{1-y}Co_yO_{2-z}X_z \qquad (9),$$

$$Li_xNi_{1-y-z}Co_yM_zA_\alpha \quad (10),$$

$$Li_xNi_{1-y-z}Co_yM_zO_{2-\alpha}X_\alpha \quad (11),$$

$$Li_xNi_{1-y-z}Mn_yM_zA_\alpha \quad (12),$$

$$Li_xNi_{1-y-z}Mn_yM_zO_{2-\alpha}X_\alpha \quad (13),\text{ and combinations thereof,}$$

where, $0.9 \leq x \leq 1.1$, $0 \leq y \leq 0.5$, $0 \leq z \leq 0.5$, and $0 \leq \alpha \leq 2$, the materials M and M' are the same or different from each other, and are selected from the group consisting of Mg, Al, Co, K, Na, Ca, Si, Ti, Sn, V, Ge, Ga, B, As, Zr, Mn, Cr, Fe, Sr, V, and rare-earth elements, the material A is selected from a group consisting of O, F, S, and P, and the material X is selected from a group consisting of F, S, and P.

28. The lithium secondary battery according to claim 26, wherein the negative electrode activation material is selected from the group consisting of crystallized carbon, amorphous carbon, carbon composite, carbon fiber, lithium metal, lithium alloy, and combinations thereof.

29. The lithium secondary battery according to claim 1, wherein the acrylic rubber has from 2 to 10 cross-linked points per molecular weight unit of 10,000 in a main chain molecule.

* * * * *